3,113,370
METHOD OF MAKING CATHODE
Leon Lerman, Palo Alto, Calif., assignor to Sylvania Electric Products Inc., a corporation of Delaware
No Drawing. Filed Sept. 30, 1960, Ser. No. 59,494
1 Claim. (Cl. 29—25.17)

This invention relates to a method of manufacturing dispenser cathodes. The term "dispenser cathode" as used herein refers to a thermionic electron emitter made of porous refractory metal, such as tungsten, impregnated with an alkaline earth substance which reacts with the refractory metal under heat to produce free alkaline earth material. The latter forms a monatomic layer on the surface of the cathode and becomes the source of emitter electrons.

Since the configuration of these cathodes varies with different applications, conventional machining techniques are used to cut and to form the refractory metal body into a slug having the desired shape and size. This machining operation raises two problems. First, the brittleness of a refractory matrix makes the machining of thin sections and wall pieces extremely difficult. Second, the machining process tends to smear the surfaces of the matrix so as to close the outer edges of the pores. This prevents thorough impregnation of the body with the emitter material and substantially impairs its usefulness as a cathode.

One prior technique of overcoming these difficulties is to impregnate the porous matrix with a relatively soft metal, such as copper or gold, prior to machining and to remove the filler metal after machining. While this solves the brittleness and smearing problems, it also introduces new problems. If all of the filler metal is not eliminated prior to the emitter impregnation step, there will be less room in the pores for emitter material and the cathode will have a correspondingly shorter life. Also, the vapor pressure of typical filler metals is such any remaining metal tends to vaporize when the cathode is heated and contaminates the electron discharge device using the cathode. This problem is more acute if the filler metal is of the type that reacts with tube parts.

Another disadvantage of using filler metals, such as copper, is that the filler tends to limit the thickness and geometric design of the cathode because the efficiency of the elimination process is related to the physical dimensions of the matrix.

This invention, briefly, is based on the discovery of the fact that a porous tungsten matrix, when impregnated with a class of emitter materials, is suitable for machining with standard techniques and tools. More specifically, the emitter material used in practicing the invention consists of a mixture of aluminum oxide in specified proportions with the oxides of barium, strontium and calcium. The refractory metal slug is initially prepared by etching to insure that its surfaces are porous and thereafter the slug is cleaned and impregnated with the emitter material so that the latter fills all of the pores. The slug is then machined to provide a cathode of desired size and shape, the emitter material itself serving to maintain the pores open and providing the matrix with a firm body so that thin wall sections can be formed. The machined cathodes, after polishing and appropriate heat treatment, are then ready for use.

The principal object of this invention is to simplify the process of making dispenser cathodes by eliminating entirely one of the steps heretofore considered to be essential and necessary in this procedure.

Another and important object is to make dispenser cathodes that are entirely free of elements and materials which may contaminate tubes and discharge devices in which the cathodes are afterwards used. More specifically, it is an object of the invention to completely eliminate the use of soft filler materials or metals during the process of manufacture so that there can be no residue of these metals for contaminating tubes in which the cathodes are used.

A dispenser cathode may be manufactured in accordance with the invention in the following way. First, a slug of pre-sintered refractory metal is provided. This refractory metal may be tungsten, molybdenum, or alloys of either, which have been sintered from a powder form into a porous homogeneous mass which comprises the slug. In order to insure that the porous structure of this body extends to all of its surfaces, the slug is etched by one of several well-known techniques, such as electrochemical etching. By way of example, the slug is immersed in a sodium hydroxide solution for a period of time dependent upon the size of the piece, is thereafter immersed in a 52%–55% solution of hydrofluoric acid, and then is boiled in water until the traces of etching solution are removed. After etching, the slug is dried.

In the next step, the piece is placed in a wet hydrogen atmosphere furnace or other wet inert gas atmospheres where the piece is fired to a temperature ranging from 1000 degrees centigrade to 1400 degrees centigrade. The time required for this baking depends upon the size of the piece being treated and may vary from 45 minutes at 1000 degrees centigrade to 30 minutes at 1400 degrees centigrade for a cylindrical piece ½ inch in diameter and 2 inches long. The slug is now ready for impregnation with emitter material.

After the slug is removed from the furnace, emitter material in powdered form is piled around the slug so that its outer surfaces are covered. The invention can be practiced with emitter material composed of two parts of aluminum oxide, $Al_2O_3$, and five parts of a mixture of the oxides of barium, strontium and calcium. A specific composition of this aluminate material which has given excellent results both as a filler and emitter medium comprises a mix of the two parts $Al_2O_3$ with a mix of oxides comprising 57% by weight of barium oxide, 39% strontium oxide and 4% calcium oxide.

The slug-emitter material combination is next heated to a temperature of 1400 degrees centigrade to 1700 degrees centigrade in a furnace atmosphere of dry nitrogen combined with hydrogen or other inert gasses; the temperature varying for different proportions of the emitter material. During this heating step, the emitter material is absorbed by the slug and substantially fills its pores. The slug is removed from the furnace and, after cooling, is ready to be cut and shaped by drilling or milling or other standard machining methods. The emitter material, having completely filled the pores, prevents them from closing when the machine tool engages the surface of the slug. The machined cathodes are then highly polished using well-known metallographic polishing media such as fine aluminum oxide paper or levigated alumina slurry.

The polished cathodes are next heat-treated in a vacuum or in an atmosphere of dry inert gasses at a temperature ranging from 1300 degrees centigrade to 1600 degrees centigrade, dependent upon the specific proportions of the emitter material used. The effect of the latter heat treating process is to initiate the reaction between the aluminate filler material and the refractory metal matrix thereby producing free alkaline earth metal (barium) which forms a monatomic layer on the surface of the slug. The electrons generated by the cathode are emitted from this layer which is replenished by the emitter material in the pores of the body throughout the life of the cathode. The final heat treatment of the cathode described above prepares it for immediate use in the particular discharge device and thereby shortens the aging time otherwise required within the device to bring the cathode to full emission efficiency.

Changes, modifications and improvements to the above-described specific embodiments of my invention may be made by those skilled in the art without departing from the spirit and scope of the invention. The appended claim defines the scope of this invention.

I claim:

A method of manufacturing a dispenser cathode of predetermined size and shape consisting of the steps of forming tungsten into a homogeneous porous body, electrochemically etching the body, heating the body in a wet hydrogen gas atmosphere to a temperature ranging from 1000 degrees centigrade to 1400 degrees centigrade, immersing the body in a powdered alkaline earth compound composed of two parts by weight of aluminum oxide and five parts by weight of a mixture of the oxides of barium, strontium and calcium, heating the body and compound to a temperature in the range of 1400 to 1700 degrees centigrade and thereby causing the compound to be absorbed by the body, cooling the body, and machining the body to the desired shape and size.

References Cited in the file of this patent

UNITED STATES PATENTS 2,878,409    Levi ------------------ Mar. 17, 1959